United States Patent [19]

van der Smissen

[11] Patent Number: 4,677,096
[45] Date of Patent: Jun. 30, 1987

[54] AIR CLEANING MATERIAL FOR USE IN AIR FILTERS

[75] Inventor: Carl-Ernst van der Smissen, Lübeck, Fed. Rep. of Germany

[73] Assignee: Drägerwerk A.G., Fed. Rep. of Germany

[21] Appl. No.: 755,071

[22] Filed: Jul. 15, 1985

Related U.S. Application Data

[63] Continuation-in-part of Ser. No. 644,979, Aug. 28, 1984, abandoned.

[30] Foreign Application Priority Data

Nov. 18, 1983 [DE] Fed. Rep. of Germany ....... 3541712

[51] Int. Cl.$^4$ .......................... B01J 20/20; B01J 20/02; B01D 53/34; A62B 23/00
[52] U.S. Cl. ......................................... 502/417; 55/70; 55/73; 55/74; 55/75; 55/387; 55/389; 502/60; 502/181; 502/183; 502/226; 502/405; 502/407; 502/415
[58] Field of Search ................. 502/417, 60, 181, 183, 502/415, 407, 226, 405; 55/70, 73, 74, 75, 387–389

[56] References Cited

U.S. PATENT DOCUMENTS

| 1,519,470 | 12/1924 | Wilson et al. | 502/417 |
| 1,792,939 | 2/1931 | Stample | 423/230 |
| 2,708,208 | 5/1955 | Furman et al. | 502/183 |
| 2,920,050 | 1/1960 | Blacet et al. | 55/74 |
| 3,436,352 | 4/1969 | Revoir et al. | 502/417 |
| 3,883,637 | 5/1975 | Benedict | 423/230 |
| 4,363,790 | 12/1982 | Anderson et al. | 423/230 |

FOREIGN PATENT DOCUMENTS

| 901027 | 3/1985 | Belgium | 502/417 |
| 2150127 | 6/1985 | United Kingdom | 502/417 |

Primary Examiner—P. E. Konopka
Attorney, Agent, or Firm—McGlew and Tuttle

[57] ABSTRACT

An air cleaning material for use in air filters comprises a porous substrate which contains zinc oxide with a metal salt. The salt advantageously comprises a metal chloride. The porous substrate advantageously comprises activated carbon or a silica gel, molecular sieves or activated alumina may serve as the substrate.

3 Claims, No Drawings 4,677,096

AIR CLEANING MATERIAL FOR USE IN AIR FILTERS

CROSS-REFERENCE TO RELATED APPLICATION

The present application is a continuation-in-part of the inventor's previous application Ser. No. 644,979 filed Aug. 28th, 1984 now abandoned.

FIELD AND BACKGROUND OF THE INVENTION

This invention relates in general to filters and in particular to a new and useful air cleaning filter having an air cleaning material comprising a porous substrate containing zinc oxide with metal salt which is capable of forming an ammine, added thereto.

Activated carbon is employed for cleaning breathing air from noxious gases, for example in gas mask filters and air conditioning filters. To obtain a satisfactory separation, the activated carbon is impregnated in various ways.

German Standard DIN No. 3181 determines the ranges of protection against the various noxious substances. For example, breathing filters with the identification letter A protect against organic gases, with the letter B against acid gases, with the letter E against sulfur dioxide, and with the letter K against ammonia. A breathing filter protecting, for example, against a mixture of B and K, requires a preparation filling making sure such a double protection. This is mostly obtained with two layers, one of a preparation against acid gases, and the other against alkaline gases (ammonia). Such filters have the disadvantage of being very voluminous, heavy and expensive and having a high resistance to air flow.

Standard DIN 3181 further determines the absorbing capacity of the filters and their respective test concentrations by introducing a filter classification as small (1), medium (2), and large (3).

German Pat. No. 530,381, teaches a sorbent composition for use in gas filters, particularly for breathing purposes, which is particularly effective against hydrogen sulfide and ammonia. That composition comprises activated carbon on which cuprous chloride is deposited. While the reaction with ammonia is then conventional, with hydrogen sulfide, hydrochloric acid forms as the final product which is intended to be absorbed by the activated carbon. The fixing capacity of activated carbon is reduced by the deposition of cyprous chloride. Because of this, the presence of hydrochloric acid becomes objectionable. Depending on the loading of the filter, hydrochloric acid may pass into the inhalation air. Thus, another poisonous substance would simply replace the initial substance that was to be removed by the filter.

U.S. Pat. No. 1,519,470 provides impregnated carbon as an air cleaning means suitable for gas filter types A and B. Metals and metal oxides, such as copper, cupric oxide, silver, silver oxide, and zinc oxide are indicated as impregnating agents. In this method, the carbon is treated with copper salts, specifically nitrates and sulfates. This is followed by heating to disintegrate the copper to its oxide.

The impreganted carbon of U.S. Pat. No. 1,519,470, however, is not suitable as an air cleaning agent or filter and thus for filters having a wide range of application.

SUMMARY OF THE INVENTION

The present invention is directed to an air cleaning material having properties simultaneously satisfying requirements in gas filter types A, B, E and K with the usual absorbing capacity, and permit manufacture of a simple single-layer filter as a multi-range filter.

This is obtained by adding a metal salt which can form an ammine. Zinc oxide has the property of excellently fixing acid gases. In addition, zinc oxide does not block the surface of the substrate very much, so that the physical adsorption is not materially reduced. Ammonia is not absorbed by zinc oxide to a sufficient extent and therefore, the invention provides admixing of a small amount of salt of a metal which has the property of being able to form an ammine. This quite considerably increases the ammonia fixing property of zinc oxide. The other good properties of zinc oxide are thereby not significantly changed. By selecting a metal salt to zinc oxide ratio of 1:1 to 1:20 and the conditions of impregnation, activated carbon can be impregnated in a manner suitable for manufacturing multi-range filters which widely satisfy special requirements.

Accordingly it is an object of the invention to provide a filter which includes a material comprising a porous substrate which contains zinc oxide and metal salt which is capable of forming an ammine.

DESCRIPTION OF THE PREFERRED EMBODIMENT

In accordance with the invention, air cleaning means for use in air filters are formed of a porous substate containing zinc oxide includes a metal salt which can form an ammine. The metal salt is advantageously a a metal chloride. In addition to the zinc oxide, the oxide of another metal may be present. The other salt advantageously comprises a chromic salt. The substrate which is used is activated carbon or a silicate gel, a molecular sieve, or an activated alumina.

Impregnation with metal chlorides, results in a high specific ammonia absorbing capacity. The unfavorable impairment of the physical adsorption is thereby minimized. By adding oxides of other metals, such as copper, cobalt, aluminum, and iron, and another metallic salt, for example a chromate, the efficiency of A-B-E-K filters for different impurities may be changed in accordance with the invention.

In the following, preparation of air cleaning means in accordance with the invention is described by way of example:

Granulated activated carbon is impregnated with an aqueous solution of a zinc salt of a volatile acid, e.g. zinc chloride, so as to obtain a zinc content of 14% by weight relative to dry carbon. The impregnated carbon is dried and then further heated until the volatile acid is satisfactory expelled to obtain a ratio of 1 to 10 of the undecomposed zinc salt to the zinc oxide formed by decomposition. After cooling down, the preparation is adjusted to a moisture content of 5%.

The application range of activated carbon or similar substances, employed for air cleaning is considerably enlarged by impregnation of the filter material substrate. While nonimpregnated activated carbon has an efficiency range corresponding to the gas filter type A according to German Standard DIN No. 3181, impregnated activated carbon preparations are known corresponding to the combined range of gas filter types B, E and K. In some applications, however, it is desirable to have a filter covering the capacities of all four of the filter types. The inventive air cleaning means does have this property due to a provided impregnation with zinc oxide and a salt of a metal, the metal salt being one that can form an ammine. Further impregnation with copper, cobalt, aluminum and iron oxides or with sulfates, nitrates, or chromates, may adapt the carbon preparation to special requirements.

The present invention therefore broadly concerns a material for use in air filters in the form of a substrate, such as activated carbon, silica gel, molecular sieve or activated alumina, containing in combination both zinc oxide and a metal salt, such as a zinc salt or one of copper, cobalt, aluminum or iron, such as a sulfate, nitrate, chromate or chloride, especially a water soluble zinc salt such as zinc chloride, optionally with an oxide of copper, cobalt, aluminum or iron also being included.

In particular, the porous substance may contain in combination both zinc oxide and a water soluble zinc salt of a volatile acid, such as zinc chloride, zinc sulfate, or zinc nitrate, thereby providing chlorine, sulfate or nitrate of the corresponding water soluble acid anion.

Such a system is thus able to be provided as a single layer multi-range filter simultaneously usable for treating organic gases, acid gases, sulfur dioxide and alkaline gases such as ammonia, in a breathing filter arrangement in a gas mask, air conditioning unit, etc.

Most especially, in the case of the system of zinc oxide and a water soluble zinc salt such as zinc chloride, the very fact that the zinc salt is water soluble enables the corresponding acid ion or zinc salt anion such as the chloride also to be partly incorporated into the zinc oxide lattice. This water soluble zinc salt derived acid ion may be termed an impurity or acid anion impurity which loosens the zinc oxide crystal lattice to an extent strongly increasing its reactivity and thus constitutes a distinct feature of the present invention.

In the instant system, therefore, although the zinc oxide serves to nullify the acid gases without adversely influencing the integrity of the substrate, yet because it is not sufficient alone for effectively absorbing ammonia, the metal salt, especially a water soluble zinc salt such as zinc chloride, advantageously provided in combination therewith, significantly enhances the ammonia fixing property of the zinc oxide without detracting from the other good properties of the zinc oxide.

Indeed, while zinc oxide alone does not have the optional chemical absorptivity for acid gases, especially $SO_2$ by way of the instant system. The combination of zinc oxide with a water soluble zinc salt, particularly zinc chloride, advantageously increases the reactivity of the zinc oxide to obtain eminently satisfactory filtering with an A-B-E-K filter.

What is claimed is:

1. A material for use in air filters comprising a porous substrate impregnated with a mixing of zinc oxide and a water soluble salt, that forms acid anions, in which the zinc oxide has a crystal lattice and has been activated by partial incorporation into zinc oxide crystal lattice, of acid anions of the water soluble zinc salt sufficiently to loosen said lattice and thereby increase the reactivity thereof, the ratio between the water soluble zinc salt and the zinc oxide being 1:1 to 1:20.

2. A material according to claim 1 wherein said water soluble zinc salt comprises zinc chloride.

3. A material according to claim 2, including chromic acid salt which is admixed with the zinc oxide and the zinc chloride.

* * * * *